United States Patent Office 3,450,631
Patented June 17, 1969

3,450,631
ION SPECIFIC MEMBRANES
Rene Bloch, Savion, David Vofsi and Ora Kedem, Rehovoth, and Aharon Katchalsky, Tel-Aviv, Israel, assignors to Yeda Research and Development Company, Rehovoth, Israel, a corporation of Israel
No Drawing. Continuation-in-part of application Ser. No. 342,529, Feb. 4, 1964. This application Dec. 13, 1965, Ser. No. 513,542
Claims priority, application Israel, Dec. 13, 1964, 22,614
Int. Cl. B01d 11/00
U.S. Cl. 210—22                             12 Claims

ABSTRACT OF THE DISCLOSURE

A method for the separation of ions of a preselected species from ions of one or more additional species having the same charge and a similar ionic diameter, involving permeating the pre-selected species through an ion-specific membrane comprising a supported polyvinyl chloride polymer film plasticized by an organo-phosphorus compound.

---

This is a continuation-in-part of co-pending application Ser. No. 342,529 filed on Feb. 4, 1964.

In the copending patent application No. 342,529, filed on Feb. 4, 1964 there is described a novel class of membranes, which is designated as "ion-specific membranes." These membranes have the property, that when such a membrane separates between two compartments of a cell, one of which compartments contains a mixture of various ions in aqueous solution, while the other compartment contains water, certain ions are transported with a high degree of selectivity into the second compartment, while the membrane constitutes at the same time a barrier for other ions of the said solution. Membranes capable of selective ion transport have hitherto been known only insofar as discrimination between positive ions and negative ions was involved. Thus, the well known process of electrodialysis of salt solutions, employing charged cationic and anionic ion-exchange membranes, has become widely applicable in recent years as a means of water desalination or for other industrial uses.

On the other hand, membranes are also known—and had indeed been widely employed in various practical processes—which provided a high degree of selectivity in separating between various species in solution making use of big differences in the sizes of said species. Such membranes, commonly known as dialysis membranes, effect the separation between said components of the solution by virtue of having a structure of interconnected pores, the size of pores being such that, while the smaller species may pass through them, larger species than the pore diameter cannot pass over to the other side of the membrane, and are thus being separated from the smaller species.

It is therefore clear that two ions both having the same charge (positive or negative) and also having similar ionic diameters can be separated neither by charged membranes used in electrodialysis, nor by ordinary dialysis membranes; such separations can now be effected by means of the novel type of "ion specific membranes" described in the aforementioned invention.

It is clear that neither ion exclusion by means of charged functional groups, incorporated in the membrane matrix, which is the principle involved in the selection mechanism of ion-exchange membranes, nor the sieve mechanism involved in the operation of ordinary dialysis membranes, can account for the very high specificity of the "ion specific" membranes of the above patent application.

Charge selective ion exclusion, not to mention specific ion exclusion, cannot be effected by a membrane not containing any charged functional groups, while a non charged dialysis membrane cannot discriminate between ions or ionic complexes, unless these ions, or complexes have very widely differing molecular radii as is, for instance, the case with a mixture of ordinary and polymeric molecules.

While no commitment to a definite mechanism of performance of the ion specific membranes is intended, it is believed that the underlying principle of operation of these membranes can conveniently be described in terms of a specific solubility of the permeating species within the membrane material.

The principle of operation is, therefore, believed to be similar to that involved in solvent extraction, where a separation between different species in a solution is effected by virtue of the extractable species being taken-up by the solvent phase, which has the property of selectively dissolving that species out of the mixture with the other species. Just as in the case of solvent extraction a particular solvent can be used for extracting a particular species or a number of certain species—but not others—from a given aqueous solution, also in the case of the membrane separation process, described hereinafter, the material comprising the membranes, in accordance with the present invention has the property of dissolving one or several species out of a mixture with other species thereby transmitting said species from one compartment of the cell to the other, while at the same time providing a non transmitting barrier against other species contained in the mixture.

It is well known that specific solvents are being used for metal ion separations in hydrometallurgical extraction processes. Particularly well known is the case of extraction of uranyl-nitrate, while in aqueous solution in admixture with ions, such as iron, aluminum and others, by means of tributyl-phosphate. This extracting solvent is highly specific to uranium species, and practically does not extract any other metal species from the respective leaches. In the case of tributyl phosphate and similar aliphatic esters of phosphoric acid it could be shown that what is essential for extraction of the uranyl-nitrate species is the group

present in all these extracting solvents, provided the remaining valencies of the central phosphorus atom are properly substituted by other radicals. Thus, quite a number of aliphatic esters of phosphoric acid, such as tributyl, tri-ethylhexyl, tri-isoamyl and other alkyl-phosphates are suitable as extractants. Aralkyl, or mixed alkyl-aryl phosphates may also be used for extracting uranyl-nitrate, but triaryl esters of phosphoric acid are not suitable for this purpose. The failure of the tri-aryl esters to extract uranyl-nitrate has been attributed to the inactivating influence of the aryl groups on the

bond, rendering it unavailable for the binding of uranyl-nitrate. However, if one aryl group is replaced by an aliphatic group, as in the case of butyl-dicresyl-phosphate, the resulting ester regains its extracting power for uranium.

Since the

group, when suitably combined with certain radicals, is largely responsible for the extracting power of the phosphoric acid esters, it is not surprising that other phosphororganic compounds containing this group are similarly effective as extracting agents for uranium. It is known that the following group of phosphorus-organic compounds in addition to the phosphates already mentioned, are effective extractants for hydrometallurgical separation of uranium.

specific membrance. It is thus apparent, that to achieve relatively high rates of permeation it is desirable to construct very thin membranes. On the other hand, the construction of very thin membranes is often impractical because of mechanical failure of such membranes, resulting in poor handling characteristics and short lifetimes.

We have now discovered a novel class of improved ion-specific membranes, suitable for hydrometallurgical separations, and based on the use of the organo-phosphorus compounds described above.

The essence of the present invention resides in the property of these above mentioned organo-phosphorus compounds to be both specific extractants for particular

TABLE I.—GROUPS OF PHOSPHOR ORGANIC COMPONENTS CAPABLE TO EXTRACT URANYL-IONS

| Name | Formula | Substituents | Species Extracted | References |
|---|---|---|---|---|
| (1) Tri-alkyl-phosphate | $(OR)_3PO$ | $C_3C_9$ alkyls | Uranyl nitrate $UO_2(NO_3)_2$ | 1-5 |
| (2) Dialkyl-alkyl-phosphate | $(OR')_2PO(OR'')$ | do | do | 3, 4, 6 |
| (3) Dialkyl-aryl-phosphate | $(OR)_2PO(OPh)$ | Butyl-phenyl | do | 3, 6 |
| (4) Dialkoxy-alkyl-phosphonate | $R PO(OR)_2$ | $C_4$-$C_8$ alkyls | do | 2, 4, 6 |
| (5) Alkoxy-dialkyl-phosphinate | $R_2PO(OR)$ | =Butyl alkyl= | do | 2 |
| (6) Trialkyl-phosphine-oxide | $R_3PO$ | Octyl, butyl | Uranyl Nitrate | 2, 5, 7, 8 |
| (7) Dialkoxy-hydrogen-phosphate | $(RO)_2P(:O)H$ | Butyl | do | 6 |

1. C. A. Blake et al.; Proceedings of the second United Nations international conference on the peaceful use of atomic energy 1958, vol. 28, p. 289.
2. Shinzo Nomura and Reinosuke Hara; Anal. Chem. Acta., 25, 212, 1961.
3. T. V. Healy and J. Kennedy; J. Inorg. Nuclear Chemistry, 10, 128, 1959.
4. T. H. Sidall III; Nucl. Eng. Chem. 51, 43, 1959 (Summary).
5. Separations by Tri-n-octylphosphine-oxide; National Academy of Sciences, Nuclear Science series, Nas.-Ns. 3102.
6. V. Turioshev et al.; Radiokhimia, 2, 419 (1960).
7. S. Umezawa et al.; Anal. Chem. Acta, 25, 360, 1961.
8. Hideo Saisho; Bull. Chem. Soc. Japan, 35, 514, 1962.

Furthermore, it is known that hydrometallurgical separations by means of these or structurally similar organo-phosphorus compounds are not restricted to separation of uranium, but are also applicable to a considerable number of other separations. These are tabulated in Table II.

metal-ion species or metal-ion complexes, and, on the other hand, to be capable of plasticizing poly-vinyl-chloride, or copolymers containing predominant amounts of vinyl-chloride polymers. By using one or more of the above mentioned organo-phosphorus compounds in com-

TABLE II.—METAL RECOVERY BY SOLVENT EXTRACTION WITH TBP

| Metal recovered | In mixture with— | Extracted species | References |
|---|---|---|---|
| (1) U | Most heavy metals | Nitrate (3 m.) | 1 |
| (2) Fe | Al | Chloride (3-5 m HCl) | 2 |
| (3) Co | Ni | Chloride (8 m HCl) | 3, 4 |
| (4) Zr | Hf | Nitrate (3-5 m $HNO_3$) | 5, 6 |
| (5) Ce | Mixture of rare earth metals | Nitrate (3 m $HNO_3$) | 7 |
| (6) Sc | Yittrium, thorium and trivalent rare earths | Chloride (6 m HCl) | 8 |
| (7) Nb | From its ores | $HF/HNO_3$ | 9, 10 |
| (8) Ruthenium | | Nitrate $HNO_3$ | 11 |
| (9) Tellur | Selen | 4-12 m HCl | 12 |
| (10) Thorium | (a) Monacite ores; (b) rare earths | Nitrates (3 m $HNO_3$) | 13, 14 |
| (11) Fe | Beryllium ore sulphate leaches | Rhodanide | 15 | m=molar.
1. C. A. Blake et al.; Proceedings of the second United Nations conference on the peaceful use of atomic energy, 1958, p. 281.
2. Blumberg et al.; Israel Mining Industries, Progress Report Nr. 510 30/SR.
3. A. Musil et al.; Microchim. Acta, 3, 476, 1959.
4. G. Weidmann; J. Can. Chem. 38, 459, 1960.
5. W. K. Millard; U.S. Report No. ISC, 234, 1952.
6. D. F. Peppard; U.S. Patent 2,923,607, Feb. 2, 1960.
7. J. C. Warf; U.S. Patent 2,564,241, Aug. 14, 1951.
8. D. F. Peppard; U.S. Patent 2,824,783, Feb. 25, 1958.
9. J. M. Fletcher; British Patent 767,038, Nucl. Eng. 2, 224, 1957.
10. D. I. Ryabchikov; Zhur. Anal. Khim 14, 700, 1959.
11. A. V. Nikolaev; Doklady Akad. Nauk. S.S.K. 127, 117, 1959.
12. Mariko Inada; J. Chem. Soc. Japan Chem. Sect. 80 (3) 273, 1959.
13. M. Smutz; Progress in Nuclear Energy, series 3, Process Chemistry vol. 1, 36, London 1956.
14. M. E. Whatley and G. L. Bridges; U.S. Report No. ISC-115, June 30, 195-, Decl. Feb. 26, 1957.
15. R. B. Byersmith, C. S. Pomelee, I. Birnbaum; U.S. Report No. NYO-1116, June 25, 1953, Decl. Jan. 6, 1956, p. 61.

It is an object of the present invention to provide novel membranes for the separation of metals. It is a further object of the present invention to provide improved ion-specific membranes. It is yet a further object of the present invention to provide improved membranes adapted for the separation of certain predetermined metals out of a mixture of metals present in an aqueous solution in ionic form. Other and further objects of the present invention will become apparent hereinafter.

Since permeation of a certain species through a membrane medium depends to an appreciable extent on the rate of diffusion, it is clear, that given a certain diffusion coefficient, the rate will depend on the thickness of the bination with poly-vinyl-chlorides (P.V.C.) or vinyl chloride containing resins, it is possible, according to the present invention, to prepare thin and durable films, which provide the "ion-specific" membranes for the purpose of the separation processes described in the examples below. While the use of thin films is of primary importance if reasonable rates of transport are to be achieved across the membrane, these films made of plasticized P.V.C. do not have sufficient mechanical strength to withstand the stress encountered in separation processes. It is common practice, therefore, to use supported films as membranes in such processes. The active thin film is made to adhere, by a suitable method, to an inert support, whose sole function it is to provide an all-permeable strong backing for the ion-specific coating.

Supports of this kind may be constructed of various materials. One such material is, for example, kraft paper. Other, more durable materials, suitable for the making of supports are various fabrics, either woven, or unwoven, made of synthetic fibers, such as for example, polyamide, polyester or polyethylene fibers.

The proper incorporation of the phosphorus-organic compounds into the said resin (or resins), enabling the production of thin, pin-hole free films, for the above purpose may be achieved by several conventional means: for example, a well known technique widely being used in the coating trade is so-called, "plastisol" method. According to this method, a fine P.V.C. powder of suitable grade ("plastisol" grade) is admixed into a specified proportion of the phosphorus-organic plasticizer, thereby forming a fine viscous suspension, commonly called plastisol. The ratio of plasticizer to resin is between 1.5:1 to 4.5:1, and preferably 3:1 in most cases. The mixture is then applied by means of a coating-knife (doctor blade) onto the backing (be it of paper or fabric), so that a layer of plastisol of predetermined thickness is achieved. The coated sheet or fabric is then placed in an oven at a temperature, usually being in the range of between 140° C. and 200° C., for a short time, during which time, so called, gelation sets in. The time necessary for gelation will depend on the particular plasticizer being used, on the ratio of resin to plasticizer, as well as on the thickness of the coating to be achieved.

In the case of most of the membranes described in the present invention coatings of between 10 microns and 150 microns, in thickness are used and the preferred range of coating thickness is between 30–60 microns. Gelation times in most cases is about 1 minute at a temperature of 140° C.

It is clear that the use of the plastisol method for the construction of said membranes can be successfully used only with backing materials capable of withstanding these relatively high temperatures of gelation. When this is not so, as in the case of a backing made of polyethylene fibers (or a porous polyethylene sheet) a different coating method has to be chosen.

Another method widely used in the vinyl coating trade is the so-called organosol technique. Yet another means of providing a plasticized P.V.C. coating on a suitable supporting medium is the film-extrusion technique.

All these methods may be used with equal effectiveness for the purpose of making the membranes in accordance with the present invention, which is not limited either by the type of material used for the backing—provided said material is inert with respect to the solutions in contact with it—or by the method whereby the coating is being applied and anchored onto said supporting backing.

In the following the present invention will be exemplified by means of a number of examples. It is clearly understood that these examples are by way of illustration only and that these are not to be construed in a limitative manner.

Although the present nivention is illustrated in the following examples by means of a specific embodiment, namely the use of paper as carrier, it is clear that equivalent results can be attained when using other mechanically strong, inert and pervious carriers. Experiments have shown that good results can be obtained when sub-. stances such as "Dacron" polyester fabric (0.03" thick and of a weight of 1.1 ounces per sq. yard); viscose rayon, triacetate, or any other woven or unwoven fabric of synthetic fibres, such as polyamide, polyester or polyethylene fibres, is used as support for the ion-specific selective film.

EXAMPLES (a) Membranes containing different plasticizers with P-O bonds for the recovery of uranium from a nitrate medium

EXAMPLE 1

A solubility membrane was prepared by applying by knife-coating a uniform layer of about 30 microns of mixture of 3.5 parts of tributyl phosphate and 1 part polyvinyl chloride to parchmentized kraft paper of high wet strength of 60 g./m.². The curing of the applied coating was effected at a temperature of 140° C. for 30 seconds, resulting in the solidification of the plastisol.

The thus produced membrane was clamped between two half-cells made of methyl-methacrylate, defining two compartments of 5 cm. diameter and 0.8 cm. width.

One of the compartments was filled with an aqueous solution, the concentration of which was 0.02 molar in uranyl nitrate, 1.0 molar in iron nitrate and 1.0 molar in aluminum nitrate. The second compartment was filled with distilled water.

Dialysis for 1 hour resulted in the selective removal of 52% of the uranium, while after 2½ hours the entire quantity of uranium had passed into the second compartment. No iron or aluminum passed through the membrane.

The life time of the membrane was tested in a cell which allowed continuous replacement of the two solutions contacting the membrane. The membrane was clamped between two rubber devices each covered by a "Lucite" plate. The membrane was 1 cm. x 100 cm. in area. This geometry was chosen in order to prevent a flow pattern with dead areas. A grid of netlon prevented the membrane from attaching at the walls of the cell. With a peristaltic pump equal flows of the uranium mixture and water were pumped through both compartments.

An identical membrane as described above was tested for several days in continuous operation. With prolonged use the permeation rate for uranium decreased, however, without decline in selectivity. After 48 hours of continuous operation at a flow rate of 150 ml./hour, the permeation rate dropped to 20% of its initial value. In the course of this operation 11 gms. uranium permeated the membrane per membrane area containing 1 gram of tributyl phosphate.

EXAMPLE 2

A solubility membrane was prepared by applying a coating of about 30 microns thickness of a mixture of 3.5 parts triethyl-hexyl phosphate and 1 part of polyvinyl chloride and curing under identical conditions as in Example 1.

This membrane was used in the same cell and with the same solution as in Example 1. After 1 hour 56% of the uranium passed into the second half-cell, while after 4 hours the first half-cell was free of uranium. No iron or aluminum passed into the second half-cell.

EXAMPLE 3

A plastisol coating, having a thickness of 40 microns and consisting of 3.5 parts dibutyl-butyl phosphonate and 1 part polyvinyl chloride, was cured for 60 seconds at 140° C. on top of a kraft paper sheet. A membrane was thus obtained which, when tested under the conditions of Example 1 in a one hour permeation experiment, 49% of the uranium, initially present in the uranium mixture, was transported across the membrane, while no iron and no aluminum permeated into the second half-cell.

EXAMPLE 4

A membrane was prepared by coating parchmentized high wet strenght kraft paper with a plastisol containing 3.5 parts butyl-dicresyl-phosphate and 1 part polyvinyl chloride with subsequent curing at 140° C. for 60 seconds. Dialysis for one hour of the uranium mixture in the permeation cell, as described in Example 1, resulted in the selective permeation of 24% of the uranium, while no iron and no aluminum passed through the membrane. The introduction of cresyl groups into the plasticizer significantly increased the life-time of the membranes, as compared to tributylphosphate. An identical membrane of dicresyl-butyl phosphate, tested in the permeation cell, designed for continuous replacement of the solution, as described in Example 1, showed a life time, as also defined above, of 250 hours at a flow rate of 150 ml./hour. During this period 30 grams uranium were recovered per gram of the plasticizer incorporated into the membrane.

Reduction of the flow to 20 ml./hour with an identical membrane resulted in a life time of 35 days, during which 73 gms. uranium were recovered per gram plasticizer present in the membrane.

Still another possibility to increase significantly the life time of the membrane is the replacement of nitric acid in the mixture, described in Example 1, by sodium nitrate. With an identical membrane as described in this example the life time under continuous operation at a flow rate of 20 ml./hour was tested by dialysis of a mixture which was 0.02 molar in uranyl nitrate, 0.1 molar in ferric nitrate and 3 molar in sodium nitrate. The life time of the membrane was 104 days, before decreasing below 20% of its initial permeation rate. The membrane remained during this period completely impermeable to ferric-ions.

EXAMPLE 5

A membrane was prepared by coating parchmentized kraft paper with a mixture of 3.5 parts butyl-dibutyl phosphinate

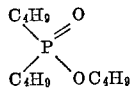

with 1 part polyvinyl chloride and curing at 160° C. for 60 seconds. The resulting coating had a thickness of 40 microns. Dialysis for one hour of the mixture described in Example 1, in the same permeation cell, resulted in permeation of 57% of the uranium, while no iron or aluminum permeated the membrane.

EXAMPLE 6

A solubility embrane was prepared by applying on parchmentized kraft paper a coating of 3.5 parts tributylphosphine oxide

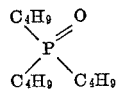

and one part polyvinyl chloride and curing it at 160° C. for 60 seconds. The membrane was used in the same cell and with the same mixture as described in Example 1. After one hour 68% of the uranium had permeated into the second half-cell, while after 2 hours the first half-cell, originally containing the uranium mixture, was completely free of uranium. No iron and no aluminum passed through the membrane.

EXAMPLE 7

A solubility membrane was prepared by applying a coating of 60 microns of a plastisol containing 3 parts of dibutyl-hydrogen phosphate

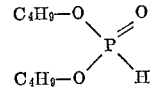

and 1 part of polyvinyl chloride on parchmentized kraft paper. The membrane was cured at 120° C. for three minutes.

The membrane was tested under the standard conditions, described in Example 1. After 1 hour dialysis 18% of the uranium had permeated into the second half cell, while no iron of aluminum was detected there.

(b) The use of membranes containing different plasticizers with P-O bonds for other separation systems.

EXAMPLE 8

A cell was prepared as in Example 1, and the first half cell was charged with an aqueous solution which was 1.0 molar in aluminum chloride, 5 molar in hydrochloric acid and 0.1 molar in ferric chloride. The second half cell was filled with water. After 3 hours 68% of the iron had passed into the second half cell, while no aluminum passed through the membrane.

EXAMPLE 9

An identical membrane, as used in Example 6, i.e., a membrane containing tributyl phosphine oxide was used in dialysis of the mixture used in Example 8. After one hour 27% of the iron initially present in the first half cell had passed into the second half cell, while no aluminum had passed the membrane.

EXAMPLE 10

A cell was prepared as in Example 1, and the first compartment was charged with an aqueous solution which was 0.05 molar in cupric rhodanide and 0.5 molar in potassium rhodanide. The second half cell was charged with 15 ml. of 0.1 M HCl. After 12 hours 87% of the copper had passed into the second half-cell. Neither hydrochloric acid nor potassium rhodanide passed through the membrane.

EXAMPLE 11

A solubility membrane was prepared by coating parchmentized high wet strength kraft paper with a composition as set out in Example 1, but the thickness of the coating was 260 microns. The curing was carried out under identical conditions. The same cell was used as in the foregoing example. The first half cell was charged with an aqueous solution which was 1.36 molar in phosphoric acid, 7.1 molar in hydrochloric acid and 0.8 molar in calcium chloride. The second half cell was charged with 15 ml. of water. After 12 hours 31% of the phosphoric acid had passed through the membrane. The membrane was impermeable towards calcium.

EXAMPLE 12

An identical membrane as used in Example 1, i.e., a membrane containing TBP, was used for the removal of traces of cobalt from a solution of nickel-chloride. One half cell of the permeation cell was charged with a solution which was 1 molar in nickel chloride, 0.01 molar in cobalt chloride and 8.5 molar in hydrochloric acid. The second half cell contained water. After dialysis for four hours 96% of the cobalt traces were removed from the nickel-solution. The membrane proved to be impermeable to nickel-ions.

EXAMPLE 13

An identical membrane, as used in Example 3, i.e. a membrane containing dibutyl-butyl phosphonate, was used for the same separation as described in the previous example. The mixture of nickel- and cobalt-chloride was dialyzed for four hours after which 89% of the cobalt, initially present in the mixture, had passed through the membrane. The membrane was impermeable to nickel-ions.

EXAMPLE 14

An identical membrane as used in Example 1, i.e. a membrane containing tributyl phosphate, was used to demonstrate the possibility of recovery thorium out of a mixture with rare earth metals.

One side of the permeation cell was filled with a mixture which was 0.1 molar in thorium nitrate, 0.1 molar in ceric nitrate and 3 molar in nitric acid. By dialysis for four hours 92% of the total thorium was recovered in the second compartment, where no cerium could be detected.

EXAMPLE 15

The same membrane as used in the previous example, i.e. a membrane containing tributyl phosphate, was used to recover niobium from a niobium bearing mineral leach.

The mixture placed on one side of the permeation cell was 0.1 molar in niobium, 0.1 molar in iron, 1 molar in hydrofluoric acid and 1 molar in nitric acid. After one hour's dialysis 18% of the niobium had permeated into the second half cell while the membrane proved to be impermeable to iron.

EXAMPLE 16

A membrane consisting of a tributyl phosphate plasticized P.V.C. resin can be used for the purification of a beryllium raffinate from iron contaminations.

The membrane used was identical with the membrane used in Example 1. One side of the dialysis cell was filled with a mixture which was 0.1 molar in beryllium, 0.1 molar in iron and 5 molar in hydrochloric acid. 43% of the ferric chloride initially present in the mixture permeated through the membrane, which was completely impermeable to beryllium-ions. After four hours the beryllium solutions were completely depleted of iron.

EXAMPLE 17

The use of solubility membranes for the purification of beryllium from iron contamination is not restricted to a TBP plasticized P.V.C. membrane. An identical membrane as used in Example 8, i.e., a membrane consisting essentially of a tributyl phosphine oxide plasticized P.V.C. resin, was used in the dialysis of the mixture, described in Example 16. In one hour's dialysis 38% of the iron permeated through the membrane, which again was found to be completely impermeable to beryllium. A six hour dialysis was necessary in order to reduce the iron content of the beryllium solution below 1% of its original concentration.

EXAMPLE 18

A membrane incorporating a nylon-fabric support was prepared by impregnating the fabric having a 0.8 mm. thickness and a weight of 30 gr./m.², with a plastisol containing 3.5 parts of tributyl phosphate and 1 part polyvinyl chloride. The curing of the coating was performed at a temperature of 140° C. for 45 seconds, resulting in the gelation of the plastisol.

The thus produced membrane was tested under the conditions described in Example 1. After one hour dialysis, 34% of the uranyl nitrate initially present in the first half cell had passed through the membrane, which was found completely impermeable to iron and aluminum.

EXAMPLE 19

A membrane was produced by coating parchmentized high wet strength kraft paper with a 45 micron thick coating of plastisol containing 3.5 parts tributyl phosphate and one part of vinylite-resin, a copolymer consisting of 83% of vinyl chloride and 17% vinyl acetate. The membrane was cured for 60 seconds at 140° C.

Tested under standard conditions, outlined in Example 1, a one hour dialysis, using said membrane, resulted in the permeation of 36% of the uranyl nitrate initially present at one side of the membrane, while the membrane was impermeable to iron and aluminum.

EXAMPLE 20

A membrane was prepared by applying a coating of 50 microns thickness of a plastisol containing 3 parts tributyl phosphate and one part of a stran-copolymer consisting of 88% vinyl chloride and 12% vinylidene chloride to parchmentized kraft paper of high wet strength. The membrane was cured at 140° C. for 60 seconds.

The membrane was tested under standard conditions, outlined in Example 1. After a one hour dialysis, 32% of the uranyl nitrate originally present at one side of the membrane permeated, while no iron or aluminum passed through the membrane.

The embodiments of the invention in which an exclusive privilege or property is claimed are defined as follows:

1. A method for the separation of ions of a pre-selected species from ions of at least one other species having the same charge and a similar ionic diameter, which comprises selectively permeating the ions of said pre-selected species, to the substantial exclusion of the ions of said other species, through an electrically uncharged, ion-specific membrane comprising a plasticized film supported on a mechanically strong, inert and pervious support, said film being constituted of polyvinyl chloride homopolymer or a vinyl chloride copolymer having a vinyl chloride content of at least 50% by weight, plasticized by at least one organo-phosphorus compound containing the grouping

in which at least one of the three free valences is satisfied by an alkyl or alkoxy group and any valence not so satisfied is satisfied by hydorgen or a hydrocarbon radical, the total number of carbon atoms in said organo-phosphorus compound not exceeding thirty-six per P=O bond.

2. The method as defined in claim 1, wherein the ratio of organo-phosphorus plasticizer to the polymer constituent of the ion-specific membrane varies between 1.5 and 4.5 parts by weight of plasticizer per part of polymer.

3. The method as defined in claim 1, in which the organo-phosphorus plasticizer incorporated in the ion-specific membrane is a triester of phosphoric acid, the alkoxy substituents of which have from 3 to 12 carbon atoms each.

4. The method as defined in claim 1, wherein the organo-phsophorus plasticizer incorporated in the ion-specific membrane is a diester of an alkyl phosphoric acid, the alkoxy substituents of which have from 3 to 12 carbon atoms each.

5. The method as defined in claim 1, wherein the organo-phosphorus plasticizer incorporated in the ion-specific membrane is a monoester of a dialkyl phosphoric acid, the alkoxy substitutent of which has from 3 to 12 carbon atoms.

6. The method as defined in claim 1, wherein the organo-phosphorus plasticizer incorporated in the ion-specific membrane is a phosphine oxide, the alkyl substituents of which have from 3 to 12 carbon atoms each.

7. The method as defined in claim 1, wherein the support for the ion-specific membrane is parchmentized paper or a woven or unwoven synthetic fiber fabric, the fibers of such fabric being inert with respect to the media contacting said membrane.

8. The method as defined in claim 1, wherein the thickness of the plasticized polymeric film comprising said membrane is between 10 and 100 microns.

9. The method as defined in claim 1, wherein the organo-phosphorus compound plasticizer in the ion-specific membrane is tributyl phosphate.

10. The method as defined in claim 1, wherein the organo-phosphorus compound plasticizer in the ion-specific membrane is triethylhexyl phosphate.

11. The method as defined in claim 1, in which the several species are incorporated in a solution which is fed across one side of said ion-specific membrane, the preselected species permeating through the membrane by dialysis.

12. The method as defined in claim 11, in which the solution contacted with said ion-specific membrane is an aqueous solution incorporating (1) uranium, nitrate, iron and aluminum ions, (2) iron, aluminum and chloride ions, (3) thorium, trivalent rare earth metal ions and nitrate ions, or (4) beryllium, iron and sulfate ions; and in which the preselected ionic species incorporated in said solution and permeated through the ion-specific membrane is (1) uranium, (2) iron, (3) thorium, or (4) iron, respectively.

References Cited

UNITED STATES PATENTS

| | | | |
|---|---|---|---|
| 2,371,868 | 3/1945 | Berg et al. | 264—126 |
| 2,717,696 | 9/1955 | Schubert | 23—337 X |
| 2,937,924 | 5/1960 | Schubert | 23—317 |
| 3,244,763 | 4/1966 | Cahn | 260—677 |
| 3,301,798 | 1/1967 | Waterman et al. | 260—2.5 |

REUBEN FRIEDMAN, *Primary Examiner.*

F. A. SPEAR, JR., *Assistant Examiner.*

U.S. Cl. X.R.

210—321, 500, 502, 507